March 29, 1932.   W. J. DAVIS   1,851,569
ELECTRIC CONDENSER
Filed Dec. 29, 1928

Inventor
WILFRID JOHN DAVIS
By his Attorney

Patented Mar. 29, 1932

1,851,569

UNITED STATES PATENT OFFICE

WILFRID JOHN DAVIS, OF CHELMSFORD, ENGLAND, ASSIGNOR TO RADIO CORPORATION OF AMERICA, A CORPORATION OF DELAWARE

ELECTRIC CONDENSER

Application filed December 29, 1928, Serial No. 329,140 and in Great Britain January 3, 1928.

This invention relates to condensers, and more particularly to high voltage dielectric condensers of the kind comprising a plurality of sections connected in series.

It has been the common practice in condensers of the kind described, to insulate the outside foils or electrodes of each section from the neighboring outside foils or electrodes of the next sections, to assemble the said sections under pressure, and to connect the said sections in series, by means of external leads, or the like, connecting their effective terminals.

The present invention has for its principal object the provision of a condenser of the kind described, in which there shall be a minimum of soldered connections and in which the potential between the ends of neighboring foils shall be reduced. It will be appreciated that the elimination of soldered connections, not only makes for easier assembly, but reduces the risk of breakdown due to brushing or flashing, which is always liable to occur from sharp points of solder.

According to this invention a condenser of the kind described comprises, a plurality of condenser sections which are connected in series by arranging the outside foil or electrode of any one section in direct contact with the outside foil or electrode of the section next to it, and then clamping the said plurality of sections together under pressure.

The invention is illustrated and explained in connection with the accompanying drawings in which.

Figure 1:
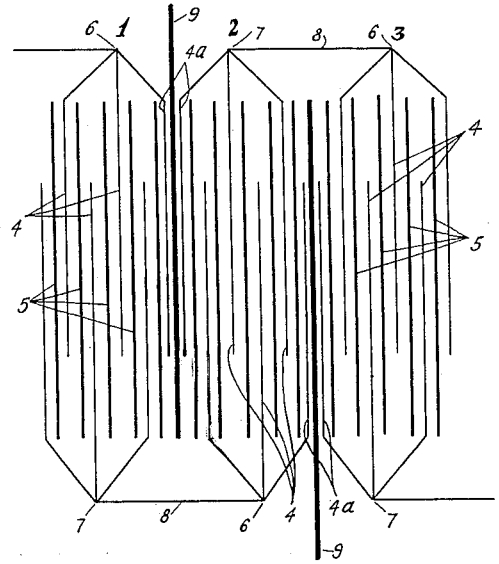
Figure 1 shows diagrammatically a multi-section condenser of conventional construction.

Referring more particularly to Figure 1, a conventional condenser is shown which comprises three sections 1, 2, 3, each section including foils or other electrodes 4 of the desired material, and dielectric spacers 5 of mica, or the like. The alternate electrodes of each section are connected together, as shown, so as to form two terminals 6, 7 for each section, and the said sections are then connected in series with one another by external leads 8. The outside electrodes 4a of each section are insulated from the neighboring outside electrodes of adjacent sections by means of mica or other "flash-over" barriers 9.

Figure 2:
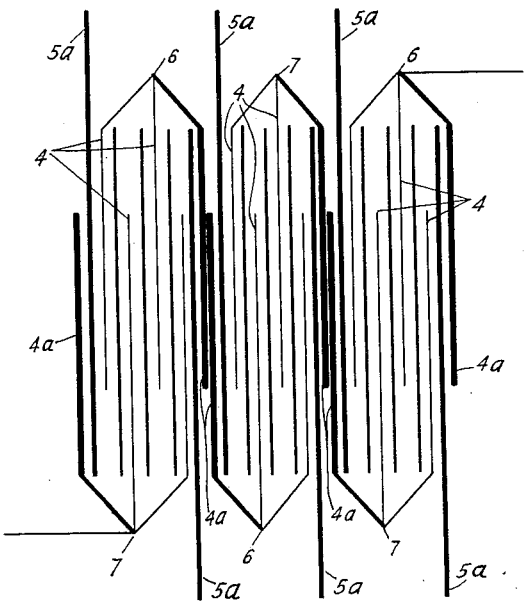
Figure 2 shows a multi-section condenser in accordance with the present invention.

However, in the construction shown in Figure 2, in which parts corresponding to the parts of the condenser shown in Figure 1 are indicated by corresponding reference numerals, the external leads 8 are dispensed with. Instead, the outside electrodes, 4a of each condenser section, are pressed together into direct contact to connect the said sections in series. In this improved construction, the outside foils or electrodes 4a are made of thicker material than are the other electrodes in order to cope with their increased current loading. The dielectric spacers 5a, adjacent said outside electrodes, are extended so as to form "flash over" barriers projecting into the direct path between all the terminals of the whole condenser. The condenser sections are then mounted between pressure clamping devices of the usual form, to apply and maintain the necessary pressure to ensure good contact between neighboring sections.

It will thus be seen that by means of the above described construction the necessity for a multiplicity of soldered joints is avoided, while the potential between the ends of neighboring foils is only one half of that which exists in condensers connected in the conventional manner shown in Figure 1.

While I have herein shown and particularly described the preferred embodiment of my invention I do not wish to be limited to the precise details of construction shown as changes may readily be made without departing from the spirit of my invention.

I claim:

1. In combination, a plurality of condenser sections, each of said sections including at least one electrode member thicker than the remaining ones in direct surface contact with a similar member of an adjacent section, and a pair of dielectric spacers between each pair of sections having disposed therebetween a pair of said contacting electrode members.

2. In combination, a plurality of condenser sections connected in series, each of said sections having its outside electrodes in direct contact with a similar electrode of an adjacent section, and a pair of dielectric members between each pair of sections having disposed therebetween a pair of said contacting electrodes.

3. In combination, a plurality of condenser sections connected in series, each of said sections having its outside electrodes in direct contact with a similar electrode of an adjacent section, and a pair of dielectric members between each pair of sections having disposed therebetween a pair of said contacting electrodes said outside electrodes being of thicker material than the other electrodes.

4. In combination, a plurality of condenser sections connected in series, each of said sections having its outside electrodes in direct contact with a similar electrode of an adjacent section, and a pair of dielectric members between each pair of sections having disposed therebetween a pair of said contacting electrodes said dielectric members extending beyond the electrodes to form flash-over barriers.

5. In a condenser, a plurality of condenser sections, each section having its outside electrode members in direct contact with the outside electrode members of adjacent sections whereby the sections are connected in series without the use of external connectors, and dielectric means, between each pair of sections, for separating the contacting electrodes from adjacent electrodes.

6. In a condenser, a plurality of condenser sections, each section having its outside electrode members in direct contact with the outside electrode members of adjacent sections whereby the sections are connected in series without the use of external connectors, and dielectric means, between each pair of sections, for separating the contacting electrodes from adjacent electrodes, said dielectric means projecting into the direct path between all the terminals of the whole condenser.

WILFRID JOHN DAVIS.